United States Patent Office

3,773,848
Patented Nov. 20, 1973

3,773,848
PROCESS FOR THE SEPARATION OF DIENE
FROM ORGANIC MIXTURES
Eli Perry, St. Louis, and William F. Strazik, St. Ann, Mo.,
assignors to Monsanto Company, St. Louis, Mo.
No Drawing. Filed Dec. 16, 1971, Ser. No. 208,888
Int. Cl. C07c 7/02
U.S. Cl. 260—681.5 R                    13 Claims

ABSTRACT OF THE DISCLOSURE

Dienes such as butadiene and isoprene are separated from organic mixtures containing same by contacting the mixture against one side of a polymeric membrane and withdrawing at the other side a vaporous mixture having increased diene concentration. The polymer membrane is an acrylonitrile containing polymer which is (1) a copolymer of acrylonitrile or (2) a polymer blend containing acrylonitrile polymer. Exemplary of the polymer membranes are copolymers of acrylonitrile and styrene, vinyl acetate and N-vinylpyrrolidone and blends of polyacrylonitrile and polystyrene, polyvinyl acetate and polyvinylpyrrolidone. Exemplary of the organic mixtures is a mixture of butadiene and butene.

BACKGROUND OF THE INVENTION

Field of the invention

This invention relates to a process for separating conjugated dienes from organic mixtures containing same. In a particular aspect this invention relates to a process for the separation of conjugated diene from organic mixtures by preferential permeation through a polymer membrane under pervaporation conditions. In a more particular aspect, this invention relates to a process for the separation of conjugated diene from organic mixtures by contacting mixtures containing diene against one side of acrylonitrile-containing polymeric membrane which is (1) a copolymer of (a) acrylonitrile (b) styrene, vinyl polymeric membrane which is (1) a copolymer of (a) acrylonitrile polymer and (b) styrene polymer, vinyl acetate polymer, or vinylpyrrolidone polymer, and recovering on the other side a vaporous mixture rich in diene.

Description of the prior art

Process for the preparation of conjugated diene such as butadiene and isoprene yield reaction mixtures which contain organic reaction products (typically substituted and unsubstituted $C_3$–$C_{12}$ hydrocarbons in) addition to organic solvent (s) and the desired diene. Separation of dienes from such organic reaction media has been accomplished by distillation procedures. Principally because of the close boiling points of dienes and typical reaction by-products, high reflux ratios and costly equipment are required for the distillation separation procedure.

SUMMARY OF THE INVENTION

It has been discovered in accordance with the present invention that conjugated dienes are effectively separated from organic mixtures containing same by contacting the mixture against one side of an acrylonitrile-containing polymeric membrane which is (1) a copolymer of (a) acrylonitrile and (b) styrene, vinyl acetate or N-vinylpyrrolidone or (2) a polymer blend of (a) acrylonitrile polymer and (b) styrene polymer, vinyl acetate polymer, or vinylpyrrolidone polymer and withdrawing at the second side a vaporous mixture having a higher concentration of diene than the aforesaid mixture. The membranes employed in the process of the present invention are highly efficient in separating diene from other components of organic mixtures using pervaporation separation techniques. The present invention is further advantageous in that it permits avoidance of costly distillation procedures.

DETAILED DESCRIPTION

The process of the present invention comprises contacting an organic feed mixture containing the diene against one side of a membrane and withdrawing at the second side a mixture having a higher concentration of the preferentially permeable diene than the aforesaid feed mixture. It is essential that the mixture at the second side be maintained at a lower chemical potential than the feed side. It is also essential that the product be withdrawn at the second side in the vapor state. In the commercial utilization of the process multi-state operation is feasible since this permits the operation of individual stages at various concentrations and temperatures in order to achieve the optimum driving force for the process.

For each individual stage the effectiveness of the separation is shown by the separation factor (S.F.).

The separation factor (S.F.) is defined as the ratio of the concentrations of two substances A and B to be separated, divided into the ratio of the concentrations of the corresponding substances in the permeate, $$S.F. = \frac{(C_A/C_B) \text{ in permeate}}{(C_A/C_B) \text{ in permeant}}$$

where $C_A$ and $C_B$ are the concentrations of the preferentially permeable component and any other component of the mixture or the sum of other components respectively.

In carrying out the process of the present invention, the first or feed side of the membrane is under a pressure such that the activities of the components are greater than the activities on the second side. Preferably the first side is above atmospheric pressure and the second side below atmospheric pressure. Still more preferably, the second side is maintained such that the pressure differential is greater than 0.01 atmosphere or preferably from about 0.1 to about 0.5 atmosphere. A further preferred mode of operation is with the second side maintained at a vacuum of greater than 0.2 mm. Hg.

The term "Chemical Potential" is employed herein as described by Olaf A. Hougen and K. M. Watson ("Chemical Process Principle, Part II," John Wiley, New York, 1947). It is related to the escaping tendency of a substance from any particular phase. For an ideal vapor or gas, this escaping tendency is equal to the partial pressure so that it varies greatly with changes in the total pressure. For a liquid, the change in escaping tendency as a function of total pressure is small. The escaping tendency always depends upon the temperature and concentration. In the present invention, the feed substance is typically a liquid solution and the other side of the membrane is maintained, such that a vapor phase exists. A vapor feed may be employed when the mixture to be separated is available in that form from an industrial process or when heat economies are to be effected in a multi-stage process.

As previously stated, the feed side may be at pressures less than atmospheric but preferably greater than atmospheric and also at pressures over and above the vapor pressure of the liquid components. The collection or permeate vapor side of the membrane is preferably less than atmoshperic pressure but under proper feed side conditions also may be greater than atmospheric pressure. The total pressure on the feed side is preferably between 0 p.s.i. absolute and 5000 p.s.i.g. The conditions are always such as to maintain a higher chemical potential on the feed side than on the collection or vapor side.

The temperatures on the feed side and the collection side may vary over a wide range. However, temperatures should be avoided which cause substantial decomposition of any of the organic materials in the mixture or of the membrane and which cause the vapor pressure on the collection side of any of the permeated materials to be exceeded by the pressure being maintained on that side. Typically an increase in temperature causes an increase in permeation rate. A dramatic increase in rate often occurs when the temperature exceeds the glass transition temperature of the polymeric membrane being used in the separation procedure.

The process of the present invention provides for the separation of dienes from organic mixtures containing same. Such dienes are substituted and unsubstituted conjugated dienes having the following structural backbone:

$$(C=C-C=C)$$

The diene may be substituted with, for example, alkyl, aromatic and halogen substituents. Typical organic components in mixtures from which the dienes are separated include $C_3-C_{12}$ hydrocarbon such as, for example, butene, hexane, propylene, octane, chlorohexane, acrylic acid, hexene, etc., and the like. Separations are carried out by removal of the preferentially permeable diene through the membrane with the said diene, in a higher concentration than in the feed, being recovered from the collection side of the membrane as a vapor and with the imposition of a state of lower chemical potential on such collection side of the membrane. For example, a mixture of butadiene and butene may be applied to one side of a flat diaphragm or membrane to accomplish removal of at least a part of the butadiene, leaving a more highly concentrated butene solution at the feed side of the membrane or diaphragm. A state of lower chemical potential is maintained on the collection or downstream side of the membrane by vacuum e.g. from 0.1 mm. to the vapor pressure of the organic component of the mixture which has the lowest vapor pressure at the membrane at the respective temperature as long as the vapor phase is present on the downstream side.

In the system referred to above, the butadiene selectively passes through the membrane with the butadiene-rich composition being rapidly removed as a vapor from the collection side of the membrane.

In contrast to the present invention, the employment of permeates in liquid phase on the second side of the membrane is impractical because the applied pressure has been found to be prohibitively high, e.g. up to 1000 atmospheres being necessary because of osmotic pressures. The liquid-liquid permeation is largely an equilibrium phenomenon unless the osmotic forces are overcome while in contrast liquid-vapor or vapor-vapor permeations are rate processes even at moderate conditions, in which the vapor is removed as soon as it reaches the collection surface of the membrane. Liquid-vapor and vapor-vapor separations are accordingly much more effectively carried out than liquid-liquid separations.

The permeation membrane used in the process of the present invention is an acrylonitrile copolymer or a polymer blend containing acrylonitrile polymer. The membrane may be a simple disk or sheet of the membrane substance which is suitable mounted in a duct or pipe, or mounted in a plate and frame filter press. Other forms of membrane may also be employed such as hollow tubes and fibers through which or around which the feed is supplied or is recirculated with the product being removed at the other side of the tubes as a vapor. Various other useful shapes and sizes are readily adaptable to commercial installations. The membranes preferred for use in the process of the present invention are: (1) copolymer of (a) acrylonitrile and (b) styrene, vinyl acetate and N-vinylpyrrolidone and (2) a polymer blend of (a) acrylonitrile polymer and (b) styrene polymer, vinyl acetate polymer or vinyl pyrrolidone polymer. The polymeric components may be linear or cross-linked and may vary over a wide range of molecular weights. The membrane, of course, must be insoluble in the organic separation medium. "Membrane insolubility" as used herein is taken to include that the membrane material is not substantially solution-swellable or sufficiently weakened by its presence in the solution to impart "rubbery" characteristics which can cause creep and rupture under the conditions of use, including high pressures. The polymers may be polymerized or so treated so that various end-groups, are present in the polymeric material. For maximum effectiveness, the copolymer or polymer blend should contain a sufficient amount of acrylonitrile or other essential monomers to substantially maintain the physical and chemical characteristics of that material. To obtain optimum results the essential acrylonitrile typically constitutes 50% or more of the total polymeric material. In the case of copolymers a copolymer acrylonitrile-styrene-vinyl chloride (75/20/5) is a suitable example. In the case of polymer blends a blend of (a) acrylonitrile-vinylchloride (90/10) and (b) styrene-vinylchloride (70/30) where portion (a) constitutes 70% of the total polymeric material is a suitable example. In the case of copolymers the percent is mole percent and in the case of blends the percent is weight percent.

The membrane may be prepared by any suitable procedure such as, for example, by casting a form or spinning a hollow fiber from a "dope" containing polymer and solvent. Such preparations are well known to the art.

An important control over the separation capacity of a particular membrane is exercised by the method used to form and solidify the membrane (e.g. casting from a melt into controlled atmospheres or from solution into baths at various concentrations and temperatures).

The art of membrane usage is well known with substantial literature being available on membrane support, fluid flow and the like. The present invention is practiced with such conventional procedures and apparatus. The membrane must, of course, be sufficiently thin to permit permeation as desired but sufficiently thick so as to not rupture under the pressure conditions employed. Typically suitable membranes have a thickness of from about ½ to about 10 mils.

The following examples illustrate specific embodiments of the present invention. In the examples the membranes employed were in the form of film disks and were mounted in a membrane holder. All membranes were prepared by casting from solution.

EXAMPLE 1

Membrane permeations were conducted for the purpose of separating 1,3-butadiene and trans-2-butene (80/20 wt. percent) using acrylontrile copolymer membranes of the present invention and for comparative purposes polyacrylonitrile membranes. Each membrane was approximately 1 mil in thickness. The runs were conducted at 20° C. In each run preferential permeation of 1,3-butadiene was effected. The results are shown in Table 1. In each run the pressure on the liquid side was atmospheric and the pressure on the vapor side was 0.1 mm. Hg.

TABLE 1

| Membrane (copolymer in mole percent: | Separation factor (SF) |
|---|---|
| (A) Polyacrylontrile [1] | 1.17 |
| (B) Polyacrylonitrile [2] | 3.3 |
| (C) Acrylonitrile/styrene (7.7%) [1] | 4–5.2 |
| (D) Acrylonitrile/styrene (15%) [1] | 5.2 |
| (E) Acrylonitrile/styrene (24%) [1] | 4.6 |
| (F) Acrylonitrile/styrene (38%) [1] | 3.7–4.2 |
| (G) Acrylonitrile/styrene (50%) [1] | 2.3 |
| (H) Acrylonitrile/styrene (60%) [1] | 2.0 |
| (I) Acrylonitrile/vinyl acetate (15%) [1] | 6.5 |
| (J) Acrylonitrile/N-vinylpyrrolidone (20%) [1] | 6.3–8.1 |
| (K) Acrylonitrile/N-vinylpyrrolidone (5%) [1] | 6.7 |

[1] Acidic end groups.
[2] Organic end groups.

EXAMPLE 2-5

Permeations were conducted following the general procedure of Example 1 for the purpose of separating 1,3-butadiene from an organic liquid consisting of 80 weight percent 1,3-butadiene and 20 weight percent trans-2-butene. The runs were conducted at room temperature. The results are shown in Table 2.

TABLE 2

| Membrane (blend polymers in weight percent): | SF |
|---|---|
| Polyacrylonitrile/poly N-vinylpyrrolidone (10%) | 5.6 |
| Polyacrylonitrile/poly N-vinylpyrrolidone (30%) | 4.6 |
| Polyacrylonitrile/poly N-vinylpyrrolidone (50%) | 4.6 |

In like manner separation of butadiene from mixtures comprising butadiene and butene are carried out using membranes which are polymer blends of polyacrylonitrile and polyvinylacetate and of polyacrylonitrile and polystyrene.

EXAMPLE 6

The procedure of Example 1 is followed to separate isoprene from a liquid mixture of isoprene, hexene and pentane using a membrane which is a copolymer of acrylonitrile and styrene (85/15).

EXAMPLE 7

The procedure of Example 1 is followed to separate piperylene from a liquid mixture containing piperylene, pentene and butene using a membrane which is a copolymer of acrylonitrile and vinyl acetate (85/15).

EXAMPLE 8

The procedure of Example 1 is followed to separate chloroprene from a liquid mixture containing chloroprene and butyl chloride using a membrane which is a polymer blend of acrylonitrile (poly) and styrene (poly) (75/25).

EXAMPLE 9

The procedure of Example 1 is followed to separate 2,3-dimethylbutadiene from a liquid mixture containing 2,3-dimethylbutadiene, hexene and hexane using a membrane which is a copolymer of acrylonitrile and N-vinylpyrrolidone (80/20).

EXAMPLE 10

The procedure of Example 1 is followed to separate 1,4-dimethylbutadiene from a liquid mixture containing 1,4-dimethylbutadiene, hexene and hexane using a membrane which is a polymer blend of polyacrylonitrile and poly N-vinylpyrrolidone (90/10).

While the invention has been described with reference to particular embodiments thereof, it will be appreciated that modifications and variations are possible without departing from the invention.

What is claimed is:

1. Process for the separation of conjugated dienes from organic feed mixtures comprising said diene and another organic component which comprises contacting the mixture against one side of a polymeric acrylonitrile-containing membrane selected from the group consisting of (1) copolymer of (a) acrylonitrile and (b) a monomer selected from the group consisting of styrene, vinyl acetate and N-vinylpyrrolidone and (2) a polymer blend of (a) acrylonitrile polymer and (b) a member selected from the group consisting of styrene polymer, vinylacetate polymer and vinylpyrrolidone polymer and withdrawing at the second side a vaporous mixture having a higher concentration of diene than the aforesaid feed mixture with the mixture at the second side being maintained at a lower chemical potential than the feed side.

2. The process of claim 1 wherein the pressure on the second side of the membrane is less than atmospheric pressure and lower than the pressure on the other side of the membrane.

3. The process of claim 1 wherein the feed mixture is a liquid mixture.

4. The process of claim 3 wherein the diene is butadiene.

5. The process of claim 3 wherein the feed mixture comprises butadiene and butene.

6. The process of claim 1 wherein the polymeric membrane is a copolymer of acrylonitrile, said polymer containing not less than 50 mole percent acrylonitrile.

7. The process of claim 1 wherein the polymeric membrane is a polymer blend of acrylonitrile polymer, said polymer blend containing not less than 50 percent by weight of acrylonitrile.

8. The process of claim 6 wherein the membrane is a copolymer of acrylonitrile and styrene.

9. The process of claim 6 wherein the membrane is a copolymer of acrylonitrile and vinyl acetate.

10. The process of claim 6 wherein the membrane is a copolymer of acrylonitrile and N-vinylpyrrolidone.

11. The process of claim 7 wherein the membrane is a polymer blend of polyacrylonitrile and poly N-vinylpyrrolidone.

12. The process of claim 7 wherein the membrane is a polymer blend of polyacrylonitrile and polystyrene.

13. The process of claim 7 wherein the membrane is a polymer blend of polyacrylonitrile and polyvinyl acetate.

References Cited
UNITED STATES PATENTS

| | | | |
|---|---|---|---|
| 2,985,588 | 5/1961 | Binning et al. | 208—308 |
| 2,947,687 | 8/1960 | Lee | 208—308 |
| 3,370,102 | 2/1968 | Carpenter et al. | 208—308 |

DELBERT E. GANTZ, Primary Examiner

C. E. SPRESSER, Jr., Assistant Examiner

U.S. Cl. X.R.

208—308; 210—23; 260—667 A